Patented Feb. 12, 1952

2,585,713

UNITED STATES PATENT OFFICE 2,585,713

PROCESS OF PREPARING ACTINOPHAGE-RESISTANT A. GRISEUS AND PREPARING STREPTOMYCIN

Harold B. Woodruff, Cranford, N. J., assignor to Merck & Co., Inc., Rahway, N. J., a corporation of New Jersey No Drawing. Application April 15, 1948, Serial No. 21,305

7 Claims. (Cl. 195—80)

This invention relates generally to the production of antibiotics and, more particularly, to the preparation of streptomycin by propagating *Actinomyces griseus* immunized to actinophage.

In the preparation of streptomycin by fermentation processes, such as for example by propagating *Actinomyces griseus* in a suitable medium, it has frequently been observed that the fermentation process is prematurely interrupted whereby the production of streptomycin ceases. This sudden interruption, is known as "early break-up."

It has been proposed to overcome this serious difficulty by medium alterations and changes in growth conditions. These efforts however have been entirely unsuccessful. In an attempt to secure a stronger and more resistant strain of *Actinomyces griseus*, ultra-violet light mutations were developed. These cultures, while varying greatly in streptomycin producing capacity, remained susceptible to a premature interruption of the fermentation process.

I have now found that this interruption is due to cell destruction caused by an actinophage which multiplies at the expense of living, streptomycin-producing strains of *Actinomyces griseus*. Electron microscope micrographs of *Actinomyces* cultures containing the presently discovered actinophage have shown the existence of a large number of particulate bodies with a rounded head of about 0.05 micron diameter and a tail of 0.015 x 0.15 micron. This actinophage is a filterable microbiological virus which infects specifically strains of *Actinomyces griseus* and initiates destruction of young cells. This actinophage is transmissible and multiplies following a transfer to a new culture of *Actinomyces griseus*. By filtering the culture after 24 hours and adding the filtrate to a fresh culture the propagation of the actinophage can be observed. Filtrates from each culture can be plated by the plaque method for determination of numbers of actinophage. For each single plaque forming particule added to the first *Actinomyces griseus* culture in this series a total of $75 \times 10^{20}$ particles had been produced by the sixth transfer.

The following table shows the multiplication of actinophage.

TABLE I

Multiplication of actinophage

| Transfer | Actinophage per ml. | Multiplication Factor | |
|---|---|---|---|
| | | Individual Transfers | Accumulative |
| 'Phage inoculum | 20,000,000,000 | | |
| 1st transfer | 32,800,000,000 | 8,200 | 8,200. |
| 2nd transfer | 100,000,000,000 | 16,000 | $131 \times 10^6$. |
| 3rd transfer | 36,000,000,000 | 1,800 | $236 \times 10^9$. |
| 4th transfer | 48,000,000,000 | 6,600 | $156 \times 10^{13}$. |
| 5th transfer | 64,000,000,000 | 6,600 | $10^8 \times 10^{17}$. |
| 6th transfer | 9,600,000,000 | 735 | $75 \times 10^{20}$. |
| Control *A. griseus* | <10 | | |

I have now discovered that it is possible to conduct the propagation of *Actinomyces griseus* in such a manner that a resistant strain is grown which can be made immune to attack by actinophage.

Thus my invention is also concerned with the isolation and cultivation of strains of *Actinomyces griseus* which are immune to attack by actinophage and are also capable of producing streptomycin in satisfactory yields.

In carrying out my new and improved process in a preferred manner *Actinomyces griseus* cells or spores are incubated in a nutrient medium containing actinophage. Due to the growth of actinophage all cells which are susceptible to attack by actinophage are destroyed thus creating favorable conditions for the multiplication of actinophage resistant cells. These resistant cells develop in large numbers and can be isolated by conventional microbiological procedures. In transferring the actinophage resistant cells to a new nutrient medium the growth of the resistant cells is further enhanced while the actinophage cannot increase in number in the presence of resistant *Actinomyces griseus*. By repeated transfer of actinophage resistant cells to new suitable nutrient media a culture of *Actinomyces griseus* was prepared which is completely free from actinophage. The new resistant cells may be propagated in the presence of actinophage without destruction. Actinophage resistant cultures of *Actinomyces griseus* have been found to differ in streptomycin producing capacity. Therefore for practical utilization, a number of actinophage resistant cultures are isolated and are tested for production of streptomycin. Those strains which are equivalent to the control are selected as stock strains for the production of streptomycin. The actinophage resistant culture of *Actinomyces griseus* have been found particularly suitable for large scale industrial production of streptomycin. Following initiation of actinophage resistant cultures in large batches, cases of early interruption due to actinophage have not been observed while the production of streptomycin in high yields was maintained during long periods of plant operation.

The following examples illustrate a method of carrying out the present invention, but it is to be understood that these examples are given by way of illustration and not of limitation.

Example 1

A nutrient medium was prepared containing the following:

|  | Per cent |
|---|---|
| Meat extract | 0.3 |
| Dextrose | 1.0 |
| N-Z-Amine (tryptic digestive casein) | 1.0 |
| Sodium chloride | 1.0 |
| Agar | 2.0 |
| Water to 100% | |

Resistant cultures of *Actinomyces griseus* culture A were developed by streaking on agar plates the resistant colonies developing on the surface of a submerged culture partially destroyed by actinophage, following further incubation in stationary culture. Also, resistant cultures were developed by streaking *Actinomyces griseus* culture on agar plates which contained actinophage.

A medium was made up containing the following:

|  | Per cent |
|---|---|
| Meat extract | 0.3 |
| Dextrose | 1.0 |
| N-Z-Amine (tryptic digestive casein) | 1.0 |
| Sodium chloride | 1.0 |
| Water to 100% | |

The medium was subdivided into Erlenmeyer flasks which were then plugged with cotton. The flask and contents were then sterilized at 120° C. for 30 minutes. After sterilization the flasks were cooled and inoculated with portions of the resistant colony streaks. The flasks were placed on a rotary shaking machine of 2½" amplitude and 220 R. P. M. providing constant agitation and aeration and incubated at 28° C. Portions of each inoculum also were streaked on agar plus phage and incubated at 28° C. The following chart shows the results of the different growths:

Example 2

A medium was made up containing the following:

|  | Per cent |
|---|---|
| N-Z-Amine (tryptic digestive casein) | 1.0 |
| Dextrose | 1.0 |
| Meat Extract | 0.3 |
| Sodium chloride | 1.0 |
| Water to 100% | |

The medium was treated as in Example 1 and the inoculum was prepared from resistant colonies of A from the streaks of Example 1 and from additional resistant colonies of several cultures transferred to slants. The slants were used to inoculate the medium. One set was prepared with 0.1 cc. filtrate of phage. The flasks were incubated at 30° on a rotary shaking machine of 2½" amplitude and 220 R. P. M. The following results were obtained:

| Culture | Activity-Units per ml. of fermented broth | | | |
|---|---|---|---|---|
|  | 3 days | | 4 days | |
|  | Control [1] | +filtrate | Control [1] | +filtrate |
| A Control | 159, 219 | <30 | 210 | <30 |
| A Isolate 1 | 51, 45 | <30 | 57, 57 | <30 |
| A Isolate 2 | 111, 120 | 276 | 102, 54 | 114 |
| A Isolate 3 | 159, 120 | 288 | 177, 165 | 264 |
| A Isolate 4 | 254, 318 | 420 | 216, 261 | 300 |
| A Isolate 5 | 114, <30 | <30 | 111, <30 | <30 |
| A Isolate 6 | 111, 309 | 345 | 96, 390 | 264 |
| A Isolate 7 | 279, 375 | 93 | 228, 300 | 150 |
| B Isolate a | <30, <30 | <30 | <30, <30 | <30 |
| B Isolate b | <30, <30 | <30 | <30, <30 | <30 |
| C Isolate a | 144, 138 | 111 | 63, 78 | 57 |
| C Isolate b | 126, 123 | 78 | 81, 159 | 72 |
| D Isolate a | 42, 84 | 87 | 36, 87 | 45 |
| D Isolate b | 89, 81 | 87 | 57, 57 | 48 |
| E Isolate a | <30, <30 | <30 | 33, <30 | 42 |
| A Isolate a | 237, 396 | 159 | 210, 339 | 204 |
| A Isolate b | 219, 219 | 198 | 174, 159 | 165 |
| F Isolate a | <30, <30 | <30 | <30, <30 | <30 |
| G Isolate a | 93, 171 | 159 | 59, 141 | 141 |
| G Isolate b | 81, 144 | <30 | 81, 519 | <30 |
| H Isolate a | 102, 117 | <30 | 114, 120 | 42 |
| H Isolate b | 159, <30 | 78 | 162, 33 | 99 |

[1] Duplicate flasks.

Example 3

A medium was prepared containing:

|  | Per cent |
|---|---|
| Soybean meal | 2 |
| Dextrose | 1 |
| Distillers solubles (SVP) | 0.5 |
| Sodium chloride | 0.25 |
| Water to 100% | |

This medium was prepared as shown in Examples 1 and 2 and inoculated with the resistant and control cultures listed below with a spore suspension inoculum.

| Culture | Growth with phage | | Activity-Units per ml. of fermented broth | | | |
|---|---|---|---|---|---|---|
|  | Plate | Submerged liquid | Control | | + Phage | |
|  |  |  | 3 days | 4 days | 3 days | 4 days |
| #1 Flask-resistant colony A | ++ | ++ | 51 | 105 | 54 | 75 |
| #2 Plate-resistant colony A | ++ | ++ | <30 | 78 | | |
| | | | 42 | 84 | 60 | 90 |
| #3 Plate-resistant colony A | ++ | ++ | | <30 | | <30 |
| #4 Plate-resistant streak, but containing plaques | ++ | ++ | 87 | 210 | 195 | 195 |
| | | | 60 | 117 | <30 | <30 |
| A control | − | − | 87 | 129 | | |

0.1 cc. of phage was added to one series of all cultures as shown below:

| Culture | Activity-Units per ml. of fermented broth on duplicate flasks | |
| --- | --- | --- |
| | 3 days | 4 days |
| I Control | 92, 102 | [1] 108, 84 |
| I Control+phage | <50, <50 | [2] <50, <50 |
| A Control | 102, 72 | [1] 84, 63 |
| A Control+phage | <50, <50 | [2] 42, <50 |
| A Isolate 4 | 87, 75 | 84, 63 |
| A Isolate 4+phage | 72, 84 | 57, 74 |
| A Isolate 6 | 48, 78 | 39, 66 |
| A Isolate 6+phage | 81, 99 | 66, 63 |
| A Isolate 7 | 48, 108 | 60, 75 |
| A Isolate 7+phage | 138, 135 | 108, 84 |
| A Isolate a | 106, 72 | 99, 45 |
| A Isolate a+phage | 99, 78 | 48, 93 |
| A Isolate b | 84, 99 | 60, 63 |
| A Isolate b+phage | 81, 72 | 63, 57 |

[1] 0.1 cc. produced no plaques.
[2] 0.1 cc. produced >1000 plaques.

Modifications may be made in carrying out the present invention without departing from the spirit and scope thereof, and the invention is to be limited only by the appended claims.

I claim:

1. Process for the preparation of streptomycin which comprises cultivating strains of *Actinomyces griseus* in the presence of actinophage, transferring the resistant cells to a new culture medium and subjecting said culture medium to agitation and aeration.

2. A process for producing actinophage resistant *Actinomyces griseus* which comprises propagating strains of *Actinomyces griseus* in a nutrient medium containing actinophage, transferring the resistant cells to a new culture medium and repeating said transfer to new media until the actinophage is substantially eliminated.

3. A process for producing actinophage resistant *Actinomyces griseus* which comprises propagating *Actinomyces griseus* in a nutrient medium containing actinophage, repeatedly selecting strains capable of producing streptomycin in high yields for transfer to new culture mediums containing actinophage, until an actinophage resistant strain is obtained which is capable of producing streptomycin in high yields.

4. A process for the production of streptomycin which comprises inoculating a growth medium with an actinophage resistant strain of *Actinomyces griseus*, produced by propagating *Actinomyces griseus* in a medium containing actinophage and repeatedly selecting high streptomycin yielding strains for transfer to and propagation in other mediums containing actinophage, and incubating the inoculated medium under submerged conditions with agitation and aeration to promote the growth of said strain and to produce streptomycin in high yields.

5. A process for producing actinophage resistant *Actinomyces griseus* which comprises propagating strains of *Actinomyces griseus* in a nutrient medium containing actinophage, transferring the resistant cells to a new culture medium and repeating said transfer to new media until substantial purification of said resistant cells has been obtained.

6. A process for the production of streptomycin which comprises inoculating a growth medium with an actinophage resistant strain of *Actinomyces griseus*, produced by propagating *Actinomyces griseus* in a medium containing actinophage and selecting high streptomycin yielding strains for transfer to and propagation in other mediums, and incubating the inoculated medium under submerged conditions with agitation and aeration to promote the growth of said strain and to produce streptomycin in high yields.

7. A process for the preparation of streptomycin which comprises inoculating a suitable nutrient medium with an actinophage resistant strain of *Actinomyces griseus*, obtained by cultivating *Actinomyces griseus* in the presence of actinophage, and subjecting said medium to agitation and aeration.

HAROLD B. WOODRUFF.

REFERENCES CITED

The following references are of record in the file of this patent:

UNITED STATES PATENTS

| Number | Name | Date |
| --- | --- | --- |
| 2,085,428 | Hanson | June 29, 1937 |

OTHER REFERENCES

Waksman, Proc. Natl. Acad. Sci., 31, 5, May 1945, pages 129 to 137.

Waksman, Jour. Am. Pharm. Assn., XXXIV, 11, pages 275 to 277.

Waksman, Reilly, and Harris, Proc. Soc. Exp. Biol. Med. (1947) 66, page 617.

Reilly, Harris, and Waksman, Jour. Bact., 54, 1947, pages 451–466.

Saudek and Colingsworth, ibid., pages 41–42.